United States Patent [19]

Patton et al.

[11] Patent Number: 4,473,663

[45] Date of Patent: Sep. 25, 1984

[54] CRYSTALLINE ALUMINOPHOSPHATE COMPOSITIONS

[75] Inventors: Robert L. Patton, Katonah, N.Y.; Richard T. Gajek, New Fairfield, Conn.

[73] Assignee: Union Carbide Corporation, Danbury, Conn.

[21] Appl. No.: 480,698

[22] Filed: Mar. 31, 1983

[51] Int. Cl.³ .................... B01J 27/14; B01J 31/02
[52] U.S. Cl. ............................. 502/208; 502/164
[58] Field of Search .............. 252/430, 435, 437; 423/305

[56] References Cited

U.S. PATENT DOCUMENTS

| | | | |
|---|---|---|---|
| 3,342,750 | 9/1967 | Kearby | 423/305 X |
| 4,066,572 | 1/1978 | Choca | 252/437 |
| 4,132,669 | 1/1979 | Choca et al. | 252/435 |
| 4,228,036 | 10/1980 | Swift et al. | 252/435 X |
| 4,289,863 | 9/1981 | Hill et al. | 252/437 X |
| 4,310,440 | 1/1982 | Wilson et al. | 252/435 |
| 4,364,855 | 12/1982 | McDaniel et al. | 252/437 |
| 4,395,387 | 7/1983 | Goltz et al. | 423/305 |

FOREIGN PATENT DOCUMENTS

| | | | |
|---|---|---|---|
| 2,730,228 | 3/1978 | Fed. Rep. of Germany | 252/437 |
| 0652170 | 3/1979 | U.S.S.R. | 252/435 |

Primary Examiner—Delbert E. Gantz
Assistant Examiner—William G. Wright
Attorney, Agent, or Firm—Gary L. Wamer

[57] ABSTRACT

A novel crystalline aluminophosphate composition having a unique crystal structure.

3 Claims, No Drawings

CRYSTALLINE ALUMINOPHOSPHATE COMPOSITIONS

FIELD OF THE INVENTION

The present invention relates to crystalline aluminophosphate compositions, and more particularly to aluminophosphate compositions which exhibit properties analogous to zeolitic molecular sieves. The present compositions represent a distinct species of the family disclosed in U.S. Pat. No. 4,310,440.

BACKGROUND OF THE INVENTION

Crystalline aluminophosphates having uniform pore dimensions ranging from about 3A to about 10A are disclosed in U.S. Pat. No. 4,310,440. The chemistry of aluminophosphates, in general, is discussed in this patent at column 1, line 42 to column 2, line 58, inclusive. The novel class of aluminophosphates disclosed in U.S. Pat. No. 4,310,440 have an essential crystalline framework structure whose chemical composition expressed in terms of molar ratios of oxides is $$Al_2O_3 : 1 \pm 0.2 P_2O_5$$

said framework structure being microporous in which the pores are uniform and in each species have nominal diameters, the dimensions of which vary, among the individual species, from about 3 to 10 Angstroms (A). These crystalline aluminophosphates are described as having an intracrystalline adsorption capacity for water at 4.6 torr and 24° C. of at least 3.5 weight percent and the adsorption of water is completely reversible while the essential framework topology is retained in both the hydrated and dehydrated state. The term "essential framework topology" means the spatial arrangement of the primary Al—O and P—O bond linkages. A lack of disruption of these primary bond linkages indicates that the framework topology has not changed.

SUMMARY OF THE INVENTION

The present invention relates to new crystalline aluminophosphate compositions having a framework structure whose chemical composition expressed in terms of mole ratios of oxides is $$Al_2O_3 : 1.0 \pm 0.2\ P_2O_5$$

and having the X-ray powder diffraction pattern which contains at least the d-spacings set forth in Table I or, alternatively, in Table A.

DETAILED DESCRIPTION OF THE INVENTION

The present invention relates to crystalline aluminophosphate compositions, denominated herein as AlPO$_4$-33 having a framework structure whose chemical composition expressed in terms of mole ratios of oxides is $$Al_2O_3 : 1.0 \pm 0.2 P_2O_5$$

and having the X-ray powder diffraction pattern which contains at least the d-spacings set forth in Table I below:

TABLE I

| 2θ | d, (A) | Relative Intensity |
|---|---|---|
| 9.25–9.55 | 9.56–9.26 | w-m |
| 12.5–12.9 | 7.08–6.86 | vs |
| 16.9–17.3 | 5.25–5.13 | w-m |
| 20.45–20.9 | 4.34–4.25 | w-m |
| 23.85–24.25 | 3.73–3.67 | w-m |
| 26.05–26.35 | 3.42–3.38 | w-m |
| 27.3–27.6 | 3.27–3.23 | vs |

The as-synthesized crystalline aluminophosphates of this invention for which X-ray powder diffraction data have been obtained to date have patterns within the generalized pattern of Table II below:

TABLE II

| 2θ | d(A) | 100 × (I/Io) |
|---|---|---|
| 9.25–9.55 | 9.56–9.26 | 7–21 |
| 12.5–12.9 | 7.08–6.86 | 64–100 |
| 15.2–15.5 | 5.83–5.72 | 2–20 |
| 16.9–17.3 | 5.25–5.13 | 14–22 |
| 17.4–17.7 | 5.10–5.01 | 4–20 |
| 18.0–18.3 | 4.93–4.85 | 1–2 |
| 19.4–19.7 | 4.58–4.51 | 1–2 |
| 20.45–20.9 | 4.34–4.25 | 11–25 |
| 20.85–21.05 | 4.26–4.22 | 0–4 |
| 21.4–21.5 | 4.15–4.13 | 0–1 |
| 22.25–22.5 | 4.00–3.95 | 0.5–3 |
| 22.9–23.2 | 3.88–3.83 | 2–6 |
| 23.85–24.25 | 3.73–3.67 | 7–31 |
| 24.95–25.2 | 3.57–3.53 | 1–4 |
| 26.05–26.35 | 3.42–3.38 | 6–38 |
| 26.86 (sh) | 3.32 | 0–1 |
| 27.3–27.6 | 3.27–3.23 | 86–100 |
| 29.5–29.75 | 3.03–3.00 | 5–11 |
| 30.1 | 2.97 | 0–2 |
| 30.75–31.0 | 2.91–2.88 | 2–5 |
| 32.0–32.2 (br) | 2.80–2.78 | 3–11 |
| 32.5–32.7 | 2.75–2.74 | 0.7–1 |
| 34.2–34.55 | 2.62–2.60 | 7–13 |
| 35.35–35.6 | 2.54–2.52 | 0.5–2 | sh = shoulder
br = broad

When the as-synthesized AlPO$_4$-33 compositions are calcined, i.e., heated at a temperature sufficiently high (typically between about 300° C. and about 700° C.) to remove essentially all of the organic templating agent present in the intracrystalline pore system, the composition has an X-ray powder diffraction pattern which contains at least the d-spacings set forth in Table A below:

TABLE A

| 2θ | d, (A) | Relative Intensity |
|---|---|---|
| 13.15–13.4 | 6.73–6.61 | vs |
| 18.05–18.35 | 4.91–4.83 | m |
| 18.4–18.6 | 4.82–4.77 | m |
| 26.55–26.7 | 3.36–3.34 (br) | m |
| 32.0–32.1 | 2.80–2.79 | m | br = broad

The calcined crystalline aluminophosphates of this invention for which X-ray powder diffraction data have been obtained to date have patterns within the generalized pattern of the Table B below:

TABLE B

| 2θ | d(A) | 100 × (I/Io) |
|---|---|---|
| 9.4–9.7 | 9.41–9.12 | 18–30 |
| 13.15–13.4 | 6.73–6.61 | 100 |
| 14.0–14.2 | 6.33–6.24 | 1–7 |

TABLE B-continued

| 2θ | d(A) | 100 × (I/Io) |
|---|---|---|
| 14.7–14.8 | 6.03–5.99 | 2–6 |
| 15.6–15.8 | 5.68–5.61 | 9–19 |
| 18.05–18.35 | 4.91–4.83 | 36–50 |
| 18.4–18.6 | 4.82–4.77 | 25–49 |
| 20.0–20.25 | 4.44–4.39 | 16–21 |
| 20.8–21.1 | 4.27–4.21 | 5–11 |
| 21.15–21.3 | 4.20–4.17 | 1–4 (sh) |
| 22.2–22.5 | 4.00–3.95 | 2–6 (br) |
| 22.6–23.1 | 3.93–3.85 | 2–8 |
| 24.15–24.4 | 3.69–3.65 | 10–18 |
| 24.5–24.7 | 3.63–3.60 | 12–21 |
| 25.4–25.6 | 3.51–3.48 | 2–4 |
| 26.55–26.7 | 3.36–3.34 | 36–40 (br) |
| 26.8–27.0 | 3.33–3.30 | 0–16 (sh) |
| 27.3–27.4 | 3.27–3.25 | 2–9 (sh) |
| 28.85–29.1 | 3.09–3.07 | 21–35 (br) |
| 29.35–29.6 | 3.04–3.02 | 5–14 |
| 30.05–30.2 | 2.97–2.96 | 15–21 |
| 31.3–31.6 | 2.86–2.83 | 1–6 (sh) |
| 32.0–32.1 | 2.80–2.79 | 40–48 |
| 32.9–33.05 | 2.72–2.71 | 2–6 (br) |
| 33.8–34.0 | 2.65–2.64 | 4–5 |
| 34.2–34.4 | 2.62–2.61 | 0–5 |
| 34.8 | 2.58 | 0–1 | sh = shoulder
br = broad

The above X-ray patterns and all other X-ray patterns appearing hereinafter were obtained by use of either a standard X-ray powder diffraction technique or by use of computer based techniques using a Siemens D-500 X-ray powder diffractometer, available from Siemens Corporation, Cherry Hill, N.J. When the standard X-ray technique is employed the radiation source is a high-intensity, copper target, X-ray tube operated at 50 Kv and 49 ma. The diffraction pattern from the copper K-alpha radiation and graphite monochromator were recorded by an X-ray spectrometer scintillation counter, pulse height analyzer and strip chart recorder.

Flat compressed powder samples are scanned at 2 degrees (2 theta) per minute, using a two second time constant. Interplanar spacings (d) in Angstrom units are obtained from the position of the diffraction peaks expressed as 2θ (theta) as observed on the strip chart where theta is the Bragg angle. Intensities were determined from the heights of diffraction peaks after subtracting background, "$I_o$" being the intensity of the strongest line or peak, and "I" being the intensity of each of the other peaks.

As will be understood by those skilled in the art the determination of the parameter 2 theta, irrespective of the technique employed, is subject to both human and mechanical error, which in combination, can impose an uncertainty of about 0.4° on each reported value of 2 theta. This uncertainty is, of course, also manifested in the reported values of the d-spacings, which are calculated from the 2 theta values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m, w and vw which represent very strong, strong, medium, weak and very weak, respectively.

AlPO$_4$-33 may be prepared by hydrothermal crystallization of a reaction mixture prepared by combining reactive sources of phosphorus and aluminum with water and at least one organic structure-directing agent ("templating agent" or "template") which can include organic amines and a quaternary ammonium salt(s). In the as-synthesized form, i.e., the form wherein the AlPO$_4$-33 prepared by hydrothermal crystallization has not been subjected to a post-synthesis treatment effective in removing the structure directing agent, the structure-directing agent is contained within the framework structure of the aluminophosphate in amounts which vary per mole of Al$_2$O$_3$. The structure-directing agent is readily removed by calcination and does not appear to be an essential constituent of the product AlPO$_4$-33 as evidenced by essentially complete absence of ion-exchangeability of the as-synthesized compositions.

The preparative process for AlPO$_4$-33 generally comprises forming a reaction mixture which in terms of molar ratios of oxides is $$Al_2O_3:1\pm0.5P_2O_5:7-100H_2O$$

and containing an effective amount of at least one organic templating agent, i.e., that amount which forms AlPO$_4$-33 product. Representative of the amount of organic template employed herein is an amount between about 0.2 and about 3.0 moles of organic templating agent per mole of Al$_2$O$_3$. The reaction mixture is placed in a reaction vessel inert toward the reaction system and heated at a temperature of at least about 100° C., and preferably between about 100° C. and about 300° C., until crystallized which is usually a period from about 2 hours to about 2 weeks or more. The solid crystalline reaction product is then recovered by any convenient method, such as filtration or centrifugation, washing with water and drying at a temperature between ambient and about 110° C. in air.

In a preferred crystallization method the source of phosphate is phosphoric acid, and source of alumina is a pseudo-boehmite hydrated aluminum oxide, the temperature is between about 125° C. to about 200° C., and the crystallization time is between about one and about seven days. The preferred ratio of oxides in the reaction mixture is $$Al_2O_3:0.8-1.2P_2O_5:25-75H_2O$$

In general the most preferred reaction mixture contains, per mole of Al$_2$O$_3$, between about 1.0 and about 2.5 moles of organic templating agent, between about 40 and about 50 moles of water and about 1.0 mole of P$_2$O$_5$.

Not all templating agents suitably employed in preparation of all aluminophosphates are believed to be generally suitable for the preparation of AlPO$_4$-33. The relationship of specific templating agents to the individual product species is not clearly understood at present. The use of tetrapropylammonium hydroxide and tetramethylammonium hydroxide have been found to act as acceptable templating agents for use in the preparation of AlPO$_4$-33. Other templates including organic amines and other quaternary ammonium compounds are also believed employable.

The as-synthesized AlPO$_4$-33 compositions are isolated after synthesis and advantageously washed with water. The as-synthesized AlPO$_4$-33 compositions may contain one or more organic templating agents within the intracrystalline pore system. The form of the organic templating agent may be an occluded molecular species or may be present as a charge balancing cation. In general, it is desirable to remove the organic templating agent by calcination at a temperature sufficient to remove substantially all of the organic templating agent. The calcination temperature is generally between about 300° C. and about 700° C., i.e., whereby the organic templating agent is removed by thermal degradation.

AlPO$_4$-33 exhibits surface characteristics which will make AlPO$_4$-33 useful as catalysts or as catalytic supports in various hydrocarbon conversion and oxidative combustion processes. AlPO$_4$-33 can be associated with catalytically active metals, e.g., by impregnation, doping and the like, by methods traditionally used in the art for the fabrication of catalyst compositions. Further, AlPO$_4$-33 has a pore size of less than about 4.3 Angstroms which makes AlPO$_4$-33 suitable for use as a molecular sieve for the separation of molecular species.

The following examples are provided to illustrate the invention and are not to be construed as limiting thereof:

EXAMPLE 1

(a) AlPO$_4$-33 was prepared by combining 5.52 grams of a hydrated aluminum oxide (a pseudo-boehmite phase comprising 74.2 weight percent (wt. %) Al$_2$O$_3$ and 25.8 wt. % H$_2$O) with a solution of 7.25 grams of tetramethylammonium hydroxide (TMAOH.5H$_2$O) in 10 grams of water. The resulting mixture was stirred until a homogeneous mixture was observed. This mixture was then mixed with 20.41 grams of an aqueous solution (40 wt. %) of tetra-n-propyl-ammonium hydroxide (TPAOH) and the resulting stirred. This mixture was then mixed with 9.22 grams of 85 wt. % orthophosphoric acid (H$_3$PO$_4$) and 7.38 grams of water and the resulting mixture stirred until homogeneous. The composition* of reaction mixture in molar oxide ratios was:

0.5(TMA)$_2$O:0.5(TPA)$_2$O:Al$_2$O$_3$:P$_2$O$_5$:50H$_2$O.

* The templating agent is reported here and may be reported in the remaining examples as the cation as associated in the oxide form or as the cation. Thus, in the formula (TMA)$_2$O the TMA corresponds to the tetramethylammonium cation. Similar designations are employed in other preparative examples.

The reaction mixture was sealed in a stainless steel pressure vessel lined with polytetrafluoroethylene and heated in an oven at 200° C. at the autogeneous pressure for 48 hours. The solid reaction product was recovered by centrifuging, washed with water and dried in air at ambient temperature.

A portion of the solid reaction product was analyzed and the following chemical analysis obtained:

|  | Weight Percent |
| --- | --- |
| Carbon | 9.7 |
| Nitrogen | 2.98 |
| Al$_2$O$_3$ | 33.1 |
| P$_2$O$_5$ | 46.9 |
| LOI** | 22.0 |

**LOI = Loss on Ignition

The above chemical analysis corresponds to a product composition in molar oxide ratios of:

0.33((TMA)$_2$O):1.0Al$_2$O$_3$:1.02P$_2$O$_5$:1.1H$_2$O

The solid reaction product had an X-ray powder diffraction pattern characterized by the following data:

TABLE III

| 2θ | d, (Å) | 100 × I/Io |
| --- | --- | --- |
| 7.306 | 12.10* | 0.9 |
| 9.392 | 9.42 | 21.0 |
| 10.231 | 8.65* | 0.7 |
| 12.681 | 6.98 | 100 |
| 14.056 | 6.30* | 0.7 |
| 15.347 | 5.77 | 9.6 |
| 17.125 | 5.18 | 13.9 |
| 17.551 | 5.05 | 11.6 |
| 18.132 | 4.89 | 2.4 |
| 19.518 | 4.55 | 2.7 |
| 20.615 | 4.31 | 23.3 |
| 20.999 | 4.23 | 2.8 |
| 21.5 | 4.13 | 1.0 |
| 22.299 | 3.99 | 2.1 |
| 23.046 | 3.86 | 4.5 |
| 23.977 | 3.71 | 21.5 |
| 24.410 | 3.65* | 0.7 |
| 25.110 | 3.55 | 2.5 |
| 26.158 | 3.41 | 18.3 |
| 26.862 | 3.32 (sh) | 1.3 |
| 27.34 | 3.26 | 86 |
| 29.58 | 3.02 | 11.2 |
| 30.83 | 2.90 | 6.2 |
| 31.50 | 2.84* | 0.7 |
| 32.09 | 2.79 | 5.9 |
| 32.59 | 2.75 | 1.2 |
| 34.38 | 2.61 | 7.3 |
| 34.95 | 2.57* | 1.0 |
| 35.43 | 2.53 | 2.0 | sh = shoulder
*peaks may contain an impurity (b) A portion of the solid reaction product was then calcined in air at about 600° C. for 1 hour. The calcined product had an X-ray diffraction pattern as set forth in Table C below:

TABLE C

| 2θ | d, (Å) | 100 × I/Io |
| --- | --- | --- |
| 9.55 | 9.3 | 20 |
| 13.3 | 6.66 | 100 |
| 14.2 | 6.23 | 2 |
| 14.7 | 6.03 | 2 |
| 15.7 | 5.64 | 12 |
| 18.1 | 4.90 | 39 |
| 18.4 | 4.82 | 32 |
| 20.0 | 4.43 | 16 |
| 20.8 | 4.27* | 11 |
| 21.15 | 4.20 | 1 (sh) |
| 22.2 | 4.00* | 3 (br) |
| 22.8 | 3.90 | 2 |
| 24.15 | 3.68 | 12 |
| 24.6 | 3.62 | 13 |
| 25.4 | 3.51 | 4 (br) |
| 26.6 | 3.35 | 39 (br) |
| 27.3 | 3.27 | 2 (sh) |
| 28.9 | 3.08 | 21 |
| 29.6 | 3.02 | 11 |
| 30.15 | 2.96 | 21 |
| 31.3 | 2.84 | 6 (sh) |
| 32.0 | 2.80 | 43 (sh) |
| 32.9 | 2.72 | 4 |
| 33.9 | 2.64 | 5 | sh = shoulder; br = broad
*peak may contain an impurity of another species (c) Adsorption capacities of AlPO$_4$-33 (prepared in part (b), supra) were measured using a standard McBain-Bakr gravimetric adsorption apparatus. The following data were obtained on the calcined sample of part (b) activated at 350° C.:

|  | Diameter, (A) | Pressure (Torr) | Temp, (°C.) | Wt. % Adsorbed |
|---|---|---|---|---|
| Oxygen | 3.46 | 100 | −183 | 17.5 |
| Xenon | 3.96 | 753 | 25 | 22.7 |
| n-Butane | 4.3 | 100 | 25 | 0.4 |
| $H_2O$ | 2.65 | 4.6 | 25 | 18.6 |

From the above data the pore size of the calcined product was determined to be greater than about 3.96 Angstroms (A), as shown by the adsorption of Xenon (kinetic diameter of 3.96A), and less than about 4.3A as shown by nil adsorption of n-butane (kinetic diameter 4.3A).

(d) The sample used for the McBain-Bakr gravimetric adsorption measurements in part (c) was again analyzed to determine the X-ray powder diffraction pattern and was found to be characterized by the X-ray pattern set forth in Table C, supra.

EXAMPLE 2

(a) AlPO$_4$-33 was prepared by combining 27.6 grams of a hydrated aluminum oxide (the pseudo-boehmite phase employed in example 1) with an aqueous solution comprising 72.5 grams of tetramethylammonium hydroxide (TMAOH) in 110.2 grams of water. The resulting mixture was then combined with 46.1 grams of 85 wt. % orthophosphoric acid ($H_3PO_4$) and 20.0 grams of water. The resulting mixture was stirred until a homogeneous mixture was observed. The composition of this reaction mixture in molar oxide ratios was

1.0(TMA)$_2$O:Al$_2$O$_3$:P$_2$O$_5$:50H$_2$O

The reaction mixture was sealed in a stainless steel pressure vessel lined with polytetrafluorethylene and heated in an oven at 200° C. at the autogenous pressure for a period of 72 hours. The solid reaction product was recovered by centrifuging, washed with water, and dried in air at 100° C. The solid reaction product had an X-ray powder diffraction pattern characterized by the following data:

TABLE IV

| 2θ | d, (A) | 100 × I/Io |
|---|---|---|
| 6.4* | 13.8 | 7 |
| 9.45 | 9.36 | 19 |
| 12.75 | 6.94 | 94 |
| 14.0* | 6.33 | 1 |
| 15.4 | 5.75 | 20 |
| 17.1 | 5.19 | 14 |
| 17.6 | 5.04 | 20 |
| 18.15 | 4.89 | 2 |
| 19.45 | 4.56 | 2 |
| 20.65 | 4.30 | 25 |
| 21.0 (sh) | 4.23 | 4 |
| 21.5 | 4.13 | 1 |
| 22.25 | 4.00 | 3 |
| 23.0 | 3.87 | 6 |
| 24.0 | 3.71 | 31 |
| 25.0 | 3.56 | 4 |
| 26.1 | 3.41 | 38 |
| 27.35 | 3.26 | 100 |
| 29.6 | 3.02 | 11 |
| 30.8 | 2.90 | 7 |
| 31.3* | 2.86 | 1 |
| 32.05 | 2.79 | 9 |
| 32.6 | 2.75 | 1 |
| 34.35 | 2.61 | 13 |
| 34.95* | 2.57 | 1 |

TABLE IV-continued

| 2θ | d, (A) | 100 × I/Io |
|---|---|---|
| 35.4 | 2.54 | 2 | sh = shoulder
*peak contains impurity from another species (b) A portion of the reaction product was calcined in air at about 500° C. for 1 hour. The calcined product adsorption capacities of the calcined product were measured using a standard McBain-Bakr gravimetric adsorption apparatus. The following data were obtained on the calcined sample activated at 350° C.:

|  | Kinetic Diameter, (A) | Pressure (Torr) | Temp, (°C.) | Wt. % Adsorbed |
|---|---|---|---|---|
| Oxygen | 3.46 | 100 | −183 | 6.7 |
| n-Hexane | 4.3 | 45 | 25 | 1.26 |
| $H_2O$ | 2.65 | 4.6 | 23 | 6.1 |

(c) The calcined sample used in part (b) for the McBain-Bakr gravimetric adsorption measurements was analyzed to determine the X-ray powder diffraction pattern and was found to contain AlPO$_4$-33, as characterized in Table A, supra, as a minor component in mixture with AlPO$_4$-25.

(d) A portion (about 2 grams) of the solid reaction product of part (a) was then placed in about one liter of water and the mixture was heated to boiling. The product was filtered from the water, washed with water and air dried at room temperature. This product was then calcined in air at about 600° C. for one hour and then cooled to room temperature. The calcined product had an X-ray diffraction pattern as set forth in Table C, supra.

The product was analyzed for its chemical composition and was found to contain: 37.4 wt. % Al$_2$O$_3$ and 42.8 wt. % P$_2$O$_5$. This corresponds to a mole ratio of Al$_2$O$_3$ to P$_2$O$_5$ of 1.0 to 0.82.

(e) Adsorption capacities were measured on the calcined sample of part (d) using a standard McBain-Bakr gravimetric adsorption apparatus. The following data were obtained on the calcined sample activated at 350° C.:

|  | Diameter, (A) | Pressure (Torr) | Temp, (°C.) | Wt. % Adsorbed |
|---|---|---|---|---|
| Oxygen | 3.46 | 100 | −183 | 19.3 |
| Xenon | 3.96 | 750 | 25 | 24.4 |
| n-Butane | 4.3 | 100 | 25 | 0.5 |
| $H_2O$ | 2.65 | 4.6 | 25 | 18.0 |

AlPO$_4$-33 was determined to be microporous and have a pore size of greater than about 3.96 Angstroms (A), as shown by the adsorption of Xenon and less than about 4.3 Angstroms as shown by nil adsorption of n-butane.

EXAMPLE 3

(a) Example 2 was repeated except that the order of addition of the various reagents was changed. AlPO$_4$-33 was prepared by first combining the reactive aluminum source with the phosphoric acid and before combining such with the aqueous solution of tetramethylammonium hydroxide. The composition of the reaction mixture in molar oxide ratios was as it was in example 2. This reaction mixture was then sealed in a stainless steel pressure vessel, as in example 2, and heated in an oven at 200° C. for 168 hours. The product was filtered, washed with water, and dried in air at 100° C. The product had an X-ray powder diffraction pattern characterized by the following data:

TABLE V

| 2θ | d, (A) | 100 ± I/Io |
|---|---|---|
| 6.2 | 14.3 | 1* |
| 9.55 | 9.26 | 7 |
| 12.8 | 6.92 | 64 |
| 14.2 | 6.24 | 1* |
| 15.4 | 5.75 | 2 |
| 17.2 | 5.16 | 22 |
| 17.65 | 5.02 | 4 |
| 18.2 | 4.87 | 1 |
| 19.6 | 4.53 | 2 |
| 20.75 | 4.28 | 11 |
| 21.05 | 4.22 | 1 |
| 22.35 | 3.98 | 1 |
| 23.1 | 3.85 | 2 |
| 24.1 | 3.69 | 7 |
| 25.1 | 3.55 | 6 |
| 26.2 | 3.40 | 6 |
| 27.5 | 3.24 | 100 |
| 29.75 | 3.00 | 5 |
| 30.95 | 2.89 | 2 |
| 31.4 | 2.85 | 1* |
| 32.1 | 2.79 | 3 (br) |
| 32.2 | 2.78 | 3 (br) |
| 32.7 | 2.74 | 1 |
| 34.45 | 2.60 | 7 |
| 35.0 | 2.56 | 1* |
| 35.6 | 2.52 | 1 | br = broad
*peak contains impurity from another species

EXAMPLE 4

(a) Example 4 was prepared by preparing a reaction mixture having the same process and composition in molar oxide ratios as in example 3, except that instead of employing the pseudo-boehmite aluminum oxide the hydrated aluminum oxide was of the gibbsite type (Al(OH)$_3$). The as-synthesized reaction product (isolated after heating in an oven at 200° C. for 168 hours) was identified by X-ray analysis and had an X-ray powder diffraction pattern characterized by the data of Table I, supra. Minor impurity peaks were observed.

(b) Equal portions of the above product and the product prepared in example 3 were mixed to form a sample which was then calcined at 500° C. in air for 1 hour. The resulting product was analyzed by X-ray and the major product identified as AlPO$_4$-33 as characterized in Table A, supra.

EXAMPLE 5

(a) AlPO$_4$-33 was prepared by combining 41.7 grams of aluminum isopropoxide (Al(i-OC$_3$H$_7$)$_3$) with 39.6 grams of water and then 23.1 grams of 85 wt. % orthophosphoric acid (H$_3$PO$_4$), and the resulting mixture was stirred until a homogeneous mixture was observed. The resulting mixture was then mixed with 18.12 grams of tetramethylammonium hydroxide (TMAOH.5H$_2$O) which had been dissolved in 20 grams of water. The resulting mixture was stirred until a homogeneous mixture was observed. The composition of the resulting mixture in molar oxide ratios was 0.5(TMA)$_2$O:Al$_2$O$_3$:P$_2$O$_5$:37H$_2$O:6C$_3$H$_7$OH The reaction mixture was sealed in a stainless steel pressure vessel, as in example 1, and heated in an oven at 200° C. at the autogenous pressure for 120 hours. The solid reaction product was recovered by centrifuging, washed with water and dried at ambient temperature.

(b) A portion of the solid reaction product was analyzed by X-ray and was characterized by the X-ray pattern of Table I, supra. Minor impurity peaks were observed.

(c) A portion of the reaction product of part (a) was calcined in air at about 500° C. for 1 hour and the adsorption capacities measured using a standard McBain-Bakr gravimetric adsorption apparatus. The following data were obtained on the calcined sample activated at 350° C.

| | Diameter, (A) | Pressure (Torr) | Temp, (°C.) | Wt. % Adsorbed |
|---|---|---|---|---|
| Oxygen | 3.46 | 100 | −183 | 6.0 |
| Xenon | 3.96 | 750 | 25 | 4.4 |
| n-Hexane | 4.3 | 45 | 25 | 1.1 |

From the above the pore size of the calcined product was determined to be greater than about 3.96A and less than about 4.3A.

(d) The sample used in part (c), above, was then analyzed by X-ray and the minor species was characterized by the X-ray pattern set forth in Tables A, supra.

What is claimed is:

1. Crystalline aluminophosphate having a framework structure whose chemical composition expressed in terms of mole ratios of oxides is Al$_2$O$_3$:1.0±0.2P$_2$O$_5$ and having the X-ray powder diffraction pattern which contains at least the d-spacings set forth in Table I.

2. Crystalline aluminophosphate having a framework structure whose chemical composition expressed in terms of mole ratios of oxides is:

Al$_2$O$_3$:1.0±0.2P$_2$O$_5$ and having the X-ray powder diffraction pattern which contains at least the d-spacings set forth in Table A.

3. Crystalline aluminophosphate of claim 2 having a pore size greater than about 3.9 Angstroms and less than about 4.3 Angstroms.

* * * * *